United States Patent [19]

Shaffer et al.

[11] 3,951,819

[45] Apr. 20, 1976

[54] SLUDGE REMOVAL SYSTEM

[75] Inventors: Robert L. Shaffer, Olathe; Donald G. Mason, Overland Park, both of Kans.

[73] Assignee: Ecodyne Corporation, Lincolnshire, Ill.

[22] Filed: Sept. 11, 1974

[21] Appl. No.: 505,192

[52] U.S. Cl.............................. 210/527; 210/530; 210/533
[51] Int. Cl.²....................................... B01D 12/00
[58] Field of Search.................... 210/197, 523–531, 210/533, 207; 137/577

[56] References Cited
UNITED STATES PATENTS

| | | | |
|---|---|---|---|
| 3,166,502 | 1/1965 | Kelly | 210/528 |
| 3,298,529 | 1/1967 | Longnecker | 210/533 |
| 3,338,827 | 8/1967 | Mausolf | 210/523 X |
| 3,349,030 | 10/1967 | Savage | 210/207 X |
| 3,371,788 | 3/1968 | Smith | 210/528 X |
| 3,494,462 | 2/1970 | Baud | 210/528 X |
| 3,669,271 | 6/1972 | McGivern | 210/527 X |
| 3,800,955 | 4/1974 | Edgerton et al. | 210/528 |

Primary Examiner—Charles N. Hart
Assistant Examiner—Robert H. Spitzer
Attorney, Agent, or Firm—Joel E. Siegel

[57] ABSTRACT

A sludge removal system for use in the removal of settled sludge collected on the bottom surface of a circular clarifier. The system includes a plurality of self-supporting sludge receiving conduits of various lengths extending radially outward from the center of the tank in a common horizontal plane. Each conduit has a sludge pick-up port associated with the outer end thereof. Vertical riser tubes extend upward from the inner ends of the conduits into a sightwell assembly. At the upper end of each riser tube is a flow control valve arrangement to regulate the amount of sludge flow through each conduit. The valve indicates a pipe within a pipe, both pipes having slotted openings cut therefrom, to provide a variable flow orifice the size of which may be controlled by rotating the inner pipe about the stationary outer pipe. The upper edges of the slotted openings extend above the static liquid level in the clarifier.

8 Claims, 7 Drawing Figures

U.S. Patent   April 20, 1976   Sheet 1 of 3   3,951,819
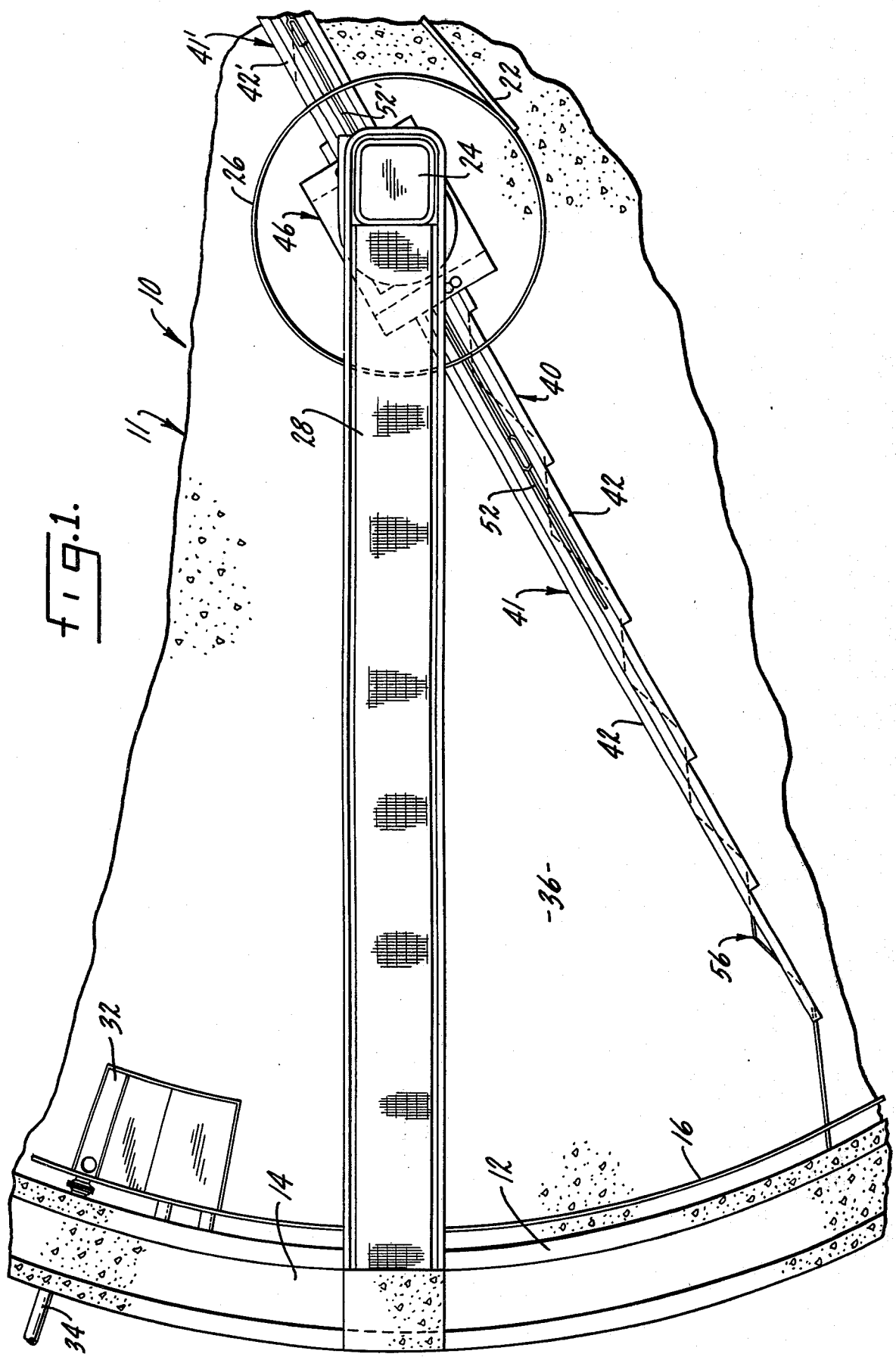

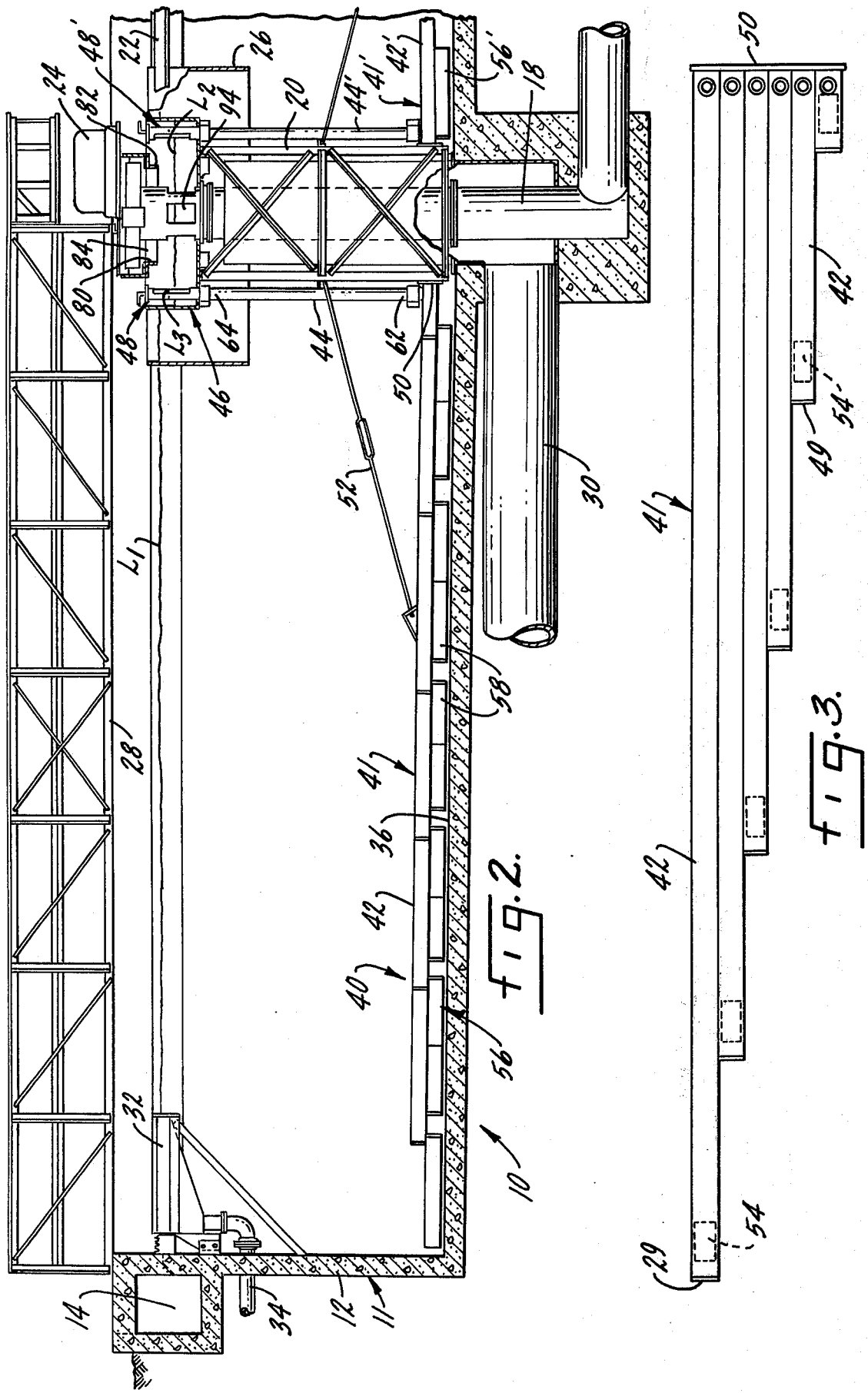

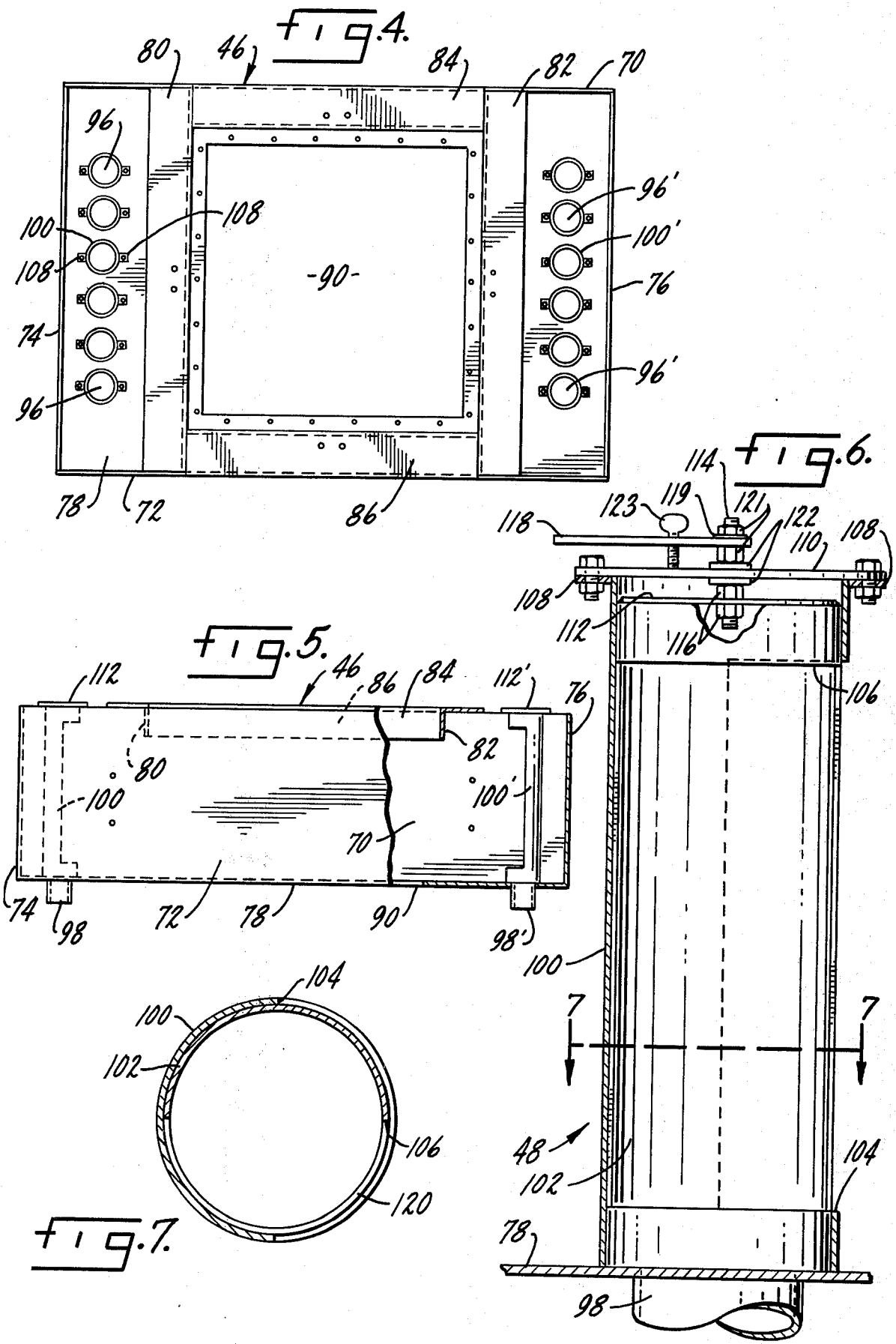

SLUDGE REMOVAL SYSTEM

BACKGROUND OF THE INVENTION

This invention relates to an improved sludge removal system for use in the removal of settled sludge collected on the bottom of a circular clarifier.

In a typical sewage or industrial waste treatment system, a clarifier tank normally defines one stage in a multi-stage treatment operation. The clarifier tank receives a "mixed liquor" from an initial stage aeration tank. Solids are separated from the liquid by settling in the clarifier, and the liquid is removed as effluent from the system and disposed of. Sludge comprising the accumulated solids is ordinarily removed for use in the next aeration stage of the sewage treatment.

To collect the sludge for removal to the aforementioned subsequent aeration stage, it has heretofore been conventional to provide a sludge collection trough at the center of the tank. The floor slopes downwardly towards the center from the periphery of the tank in a generally inverted conical configuration. It is intended that the sludge move inwardly towards the sludge collection trough where the sludge is drawn off by suitable means. To assist the movement of the sludge on the clarifier floor, a sludge scraper rake arrangement is usually provided.

In recent years the art of sludge removal has progressed to the use of sludge removal apparatus which utilizes the influence of the hydrostatic head imposed by the mass of liquid in the tank to force the sludge through uprising tubes. One such prior design comprises a tapered ported conduit rotatably mounted to sweep the floor of the tank. The ports are spaced along the bottom of the conduit and sludge settling on the floor of the tank is forced by hydrostatic pressure through the ports and along the conduit to a central discharge point. The main disadvantage of such apparatus is its inability to control the rate of solids withdrawal at the various discharge ports in proportion to different solids concentrations across the floor of the tank as a result of varying rates of solids settling.

Another heretofore used sludge removal apparatus includes a sludge rake structure mounted for slow rotation about the tank axis. The rake is provided with a plurality of uprising draw-off pipes, supported and rotated about the center column by the rake structure, with their inlet ends adjacent the tank floor whereby sludge is forced upwardly through the conduits and is delivered to a common collecting sump for eventual removal from the clarifier. Separate valves are provided on each conduit for control of the sludge withdrawal rate. The main disadvantage of such a system is that the sludge withdrawal control is independent of the rate at which collected sludge is eventually discharged from the collecting sump. As a result, increased sludge production cannot be accommodated except by resort to adjustment of each valve.

A most recent sludge removal design attempts to solve the above mentioned problems by providing apparatus which includes a sludge rake provided for rotation about the tank axis. The rake is provided with a plurality of nonstructural sludge conveying conduits of varying lengths which extend generally radially outward at different elevations to preselected areas of the tank bottom. A separate sludge receiving sump is provided for receipt of the sludge directly from a corresponding sludge conduit. A rotating ring is provided adjacent the sludge receiving sumps for receiving sludge from the sumps through corresponding submerged ports located between the lower portions of the sumps and the ring. The bottoms of the sumps and the rings are positioned below the normal liquid level of the tank. Adjustment means are provided to each port for maintaining a normal sludge level in the corresponding sludge receiving sump above the level of the port. An example of such a design is disclosed in U.S. Pat. No. 3,298,529.

Although the above design has solved the hereinabove mentioned problem of accommodating a wide range of sludge withdrawal rates without frequent adjustment, it still lacks various features desired from the commercial standpoint. This is due to the fact that the sludge conveying conduits and sludge rake present a large surface area in vertical section which results in increased drag and consequently requires a large torque output from the drive mechanism. Along the same lines, this large cross sectional surface area tends to rotate the entire mass of the sludge blanket which significantly impedes the sludge removal process. Another disadvantage of the above design is that floating material and suspended solids tend to collect on the top surfaces of the sludge receiving sumps as a result of the ports always being submerged. This requires periodic cleaning to prevent the formation of an excessive build-up of what becomes an unsightly and smelly mess.

SUMMARY OF THE INVENTION

Accordingly, it is a primary object of the present invention to provide a hydrostatic pressure sludge removal system for use with clarification apparatus which reduces the torque requirement of the drive mechanism as compared to prior systems.

Another object of the invention is to provide a hydrostatic pressure sludge removal system specifically designed for use with clarification apparatus which eliminates the need for extensive structural support members to support the sludge conduits associated therewith.

A further object of the invention is to provide such a hydrostatic sludge removal system which eliminates the tendency of the heretofore systems to rotate the entire mass of the sludge blanket.

A still further object of the present invention is to provide a hydrostatic sludge removal system which is capable of accommodating a wide range of sludge withdrawal rates without changing the relative proportion through each sludge conduit and without creating a build-up of floating or suspended matter on the top surface of the sludge receiving sumps or sightwell assembly.

Another object of the present invention is to provide a hydrostatic sludge removal system which reduces the amount of structure required and consequently simplifies the design and reduces its cost.

These and other objects are realized in accordance with the present invention by providing a sludge removal system which includes a plurality of self-supporting sludge receiving conduits of various lengths extending radially outward from the center of the tank in a common horizontal plane. Each conduit has a sludge pick-up port associated with the outer end thereof such that upon rotation of the conduits about the center axis of the tank the sludge is uniformly collected over the entire bottom of the tank. A plurality of V scrapers are secured to the lower surfaces of the conduits to guide the flow through the ports into the conduits. The sludge then flows to the center of the tank within the conduits and up a corresponding vertical riser tube. At the top of each riser tube is a unique flow control valve arrangement to regulate the amount of sludge flow through each conduit. It includes a pipe within a pipe, both pipes having slotted openings cut therefrom, to provide a variable flow orifice which may be controlled by rotating the inner pipe about the stationary outer pipe so as to change the size of the orifice through which the sludge flows. The upper edges of the slotted openings extend above the elevation of the normal liquid level within the tank to ensure that the liquid within the pipes does not reach the upper edges of the openings. This prevents the accumulation of floating or suspended solids.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein:

FIG. 1 is a fragmentary plan view of a typical clarifier tank incorporating the sludge removal system of the present invention;

FIG. 2 is a vertical section of the apparatus as shown in FIG. 1;

FIG. 3 is a plan view of the sludge conduits in accordance with the present invention;

FIG. 4 is a plan view of the sightwell box subassembly in accordance with the present invention;

FIG. 5 is an elevational view of the sightwell box sub-assembly as shown in FIG. 4;

FIG. 6 is a sectional view of the flow control valve assembly in accordance with the present invention; and FIG. 7 is a sectional view taken along line 7—7 in FIG. 6.

DESCRIPTION OF A PREFERRED EMBODIMENT

Referring to FIGS. 1 and 2, a portion of a sewage treatment clarifier is illustrated generally at 10. The clarifier 10 includes a tank 11, having a generally circular cylindrical outer wall 12, which is provided with an effluent trough 14 and a scum baffle 16, both of which are of well known construction. The effluent trough 14 slopes to an outlet pipe (not shown) for removal of clarified liquid from tank 11. Rising from the center of tank 11 is a center support column and sludge return line 18. A torque cage 20 surrounds column 18 and is supported therefrom to permit its rotation thereabout through a drive assembly 24 supported thereabove in a manner which will hereinafter become more apparent. A stilling well assembly 26 is secured to cage 20 at an upper portion thereof for rotation therewith. A walkway 28 extends across the upper edge of tank 11 to permit access to the center of tank 11. A clarifier inlet line 30 extends up the center of cage 20 surrounding column 18 to supply raw wastewater or mixed liquor; into stilling well assembly 26. A surface skimming arm 22 is preferably secured to stilling well assembly 26 for rotation therewith so as to sweep the surface of the liquid in tank 11 and direct floating matter ahead of it into a scum trough 32 mounted adjacent the outer periphery of tank 11. A scum draw-off pipe assembly 34 is provided to remove the scum and flushing water from trough 32 in a well known manner.

In operation, wastewater or sewage, which has been aerated and mixed with activated sludge, enters the stilling well assembly 26 through inlet pipe 30 and flows into tank 11. In tank 11, the solid material, or sludge, settles out and is deposited on the bottom surface 36 of tank 11. The liquid in the clarifier, free of settleable solids, overflows into the effluent trough 14 and is removed therefrom through an outlet pipe (not shown). The solid material, or sludge, settling on the bottom surface 36 of the tank is removed therefrom by the improved sludge removal system 40 of the present invention for conditioning and future mixture with incoming wastewater or sewage.

Referring to FIGS. 1 – 3, sludge removal system 40 includes a suction arm 41, riser tubes 44, a sightwell assembly 46, and flow control valve assemblies 48. Suction arm 41 is made up of a plurality of self-supporting structural sludge conduits 42 which are secured to cage 20 and extend radially outward therefrom. Sludge conduits 42 are of rectangular tubular cross section with the longer side being in the horizontal direction. The conduits 42 are of different lengths, as best seen in FIG. 3, and consequently extend different distances outward from the cage 20. The conduits 42 are secured to one another in a common horizontal plane in a conventional manner. The outer ends of conduits 42 are closed off by caps 49 and the inner ends are closed off by a plate 50 which in turn is secured to cage 20. The conduits 42 are constructed from a sufficiently rigid material, i.e. ¼ inch structural steel tubing, to permit them to extend in excess of twenty-five feet without requiring an elaborate structural support system. By so doing, the profile of the suction arm 41 is kept to a minimum. A guy wire 52, extending between the top surface of conduits 42 approximately midway between the inner and outer ends of suction arm 41 and the cage 20, may be provided to reduce the stress on the joint between the conduits 42 and the cage 20.

Suction ports 54, of rectangular shape, are provided through the bottom surfaces of each conduit 42 adjacent the respective ends thereof. Ports 54 are preferably evenly radially spaced over the distance of the suction arm 41. The width of the ports 54 are approximately equal to the width of conduits 42 and they are approximately twice that distance in length. V-shape scraper blades 56 are secured to the bottom surfaces of conduits 42, as best seen in FIGS. 1 and 2. The blades are spaced along the conduits such that the ports 54 are positioned therebetween and the apexes of the blades point in the direction of rotation of the conduits 42. The adjacent leg segments 58 of adjacent blades cooperate to direct the sludge into a corresponding port 54.

Extending vertically upward from the inner ends of each conduit 42 is a riser tube 44 having a lower end 62 in fluid communication with an opening in the top surface of the corresponding conduit. Riser tubes 44 are positioned a short distance outside of cage 20 and rotate therewith.

Referring to FIGS. 4 and 5, sightwell assembly 46 is defined between upstanding side walls 70, 72, 74 and 76 and a bottom surface 78. Angle iron supports 80 and 82 extend across sightwell 46 between the upper edges of side walls 70 and 72 and angle iron supports 84 and 86 extend between the angle iron supports 80 and 82 adjacent the side walls 70 and 72. Angle iron supports 80, 82, 84 and 86 are secured in a suitable manner to drive assembly 24 for rotation therewith. Torque cage 20 is in turn secured to and supported from the bottom surface 78 of sightwell 46. A rectangular opening 90 is centrally formed in bottom surface 78 to receive center column and sludge return 18 therethrough. Drive assembly 24 is in turn suitably supported on top of column 18 above sightwell 46. Openings 94 are formed through the portion of column 18 which is confined within sightwell 46 to permit sludge from sightwell 46 to pass therethrough and gravitate down column 18. The upper edges of walls 70, 72, 74 and 76 extend above the static liquid level of the tank 11. A series of openings 96 are formed through bottom surface 78, having stub members 98 extending downward therefrom, to respectively receive the corresponding upper ends 64 of riser tubes 44.

Referring to FIGS. 2 and 4-7, a flow control valve assembly 48 is provided above each riser tube 44 to control the rate of liquid flow therethrough. Control valve 48 includes an outer pipe 100 and an inner pipe 102 which is positioned within the outer pipe 100 in sliding contact with the inner surface thereof. Outer pipe 100 is centered over a corresponding opening 96 and welded to the bottom surface 78. Outer pipe 100 and inner pipe 102 respectively have vertically elongated rectangular slots 104 and 106 cut from approximately 50% of their circumference as seen in FIG. 7, and most of their height, as seen in FIG. 6. The upper end of pipe 100 has a pair of connecting plates 108 secured thereto which in turn are bolted to a cap member 110 closing off the upper end of pipe 100. The upper end of pipe 102 is closed off by a cap member 112 welded to the upper edge thereof. Extending through centrally formed openings in cap members 110 and 112 is a vertical shaft 114. The lower end of shaft 114 is rigidly secured to cap member 112 by nuts 116 and the upper end of shaft 114 is rigidly secured to a valve handle 118 by locking washer 119 and nuts 121. A pair of washers 122 are provided around shaft 114 and sandwich cap member 110 therebetween so as to permit shaft 114 and inner pipe 102 secured thereto to rotate relative to inner pipe 100 upon the application of a turning force through handle 118. The rate of liquid flow through the control valve 48 is selectively variable dependent upon the percentage of overlap of the slots 104 and 106 and consequently the size of the thereby created flow orifice 120. A thumb screw 123 is threaded through handle 118 to selectively contact the upper surface of cap member 110 and lock handle 118 in a fixed position.

The sludge removal system 40 as hereinabove described was directed to one half of the system; the other half being identical but opposite to the first half is referenced in the drawings by the same corresponding numerals followed by a prime sign.

In operation, the liquid level within tank 11 is at its normal or static level, indicated at $L_1$ in FIG. 2. The pressure or hydrostatic head created by this overlying body of liquid in the tank 11 is effective to force sludge from the bottom surface 36 through suction ports 54 into conduits 42 and then up riser tubes 44 through control valves 48 into sightwell 46. The sludge within sightwell 46 passes through openings 94 into and then down column 18 for removal from the clarifier. The sludge level in the sightwell 46, indicated at $L_2$ in FIG. 2, is dependent upon the rate of sludge removal therefrom which may either be determined by the hydrostatic head in the tank or controlled by an auxillary sludge pump (not shown) associated with column 18. In either case as the sludge removal rate from sightwell 46 is increased the level $L_2$ therein is decreased which increases the hydrostatic head and the sludge withdrawal rate through the conduits 42. Conversely, if the sludge removal rate from sightwell 46 is decreased the level $L_2$ therein is increased which decreases the hydrostatic head and the sludge withdrawal rate through the conduits 42.

When all the control valves 48 are adjusted to form the same size flow orifice 120 the withdrawal flow rate through each port 54 is substantially equal. However, since the sludge does not necessarily uniformly settle over the bottom surface 36 it is desireable to increase the relative withdrawal rates through the ports 54 in proportion to quantity of sludge settling in the area which they serve. The quantity and consistency of sludge leaving the respective control valves 48 may be observed from the walkway 28 to determine the relative sludge concentrations in the areas being served by the corresponding conduits 42. By decreasing the size of the flow orifice 120 in one control valve 48 relative to the others the sludge level in its pipe 102, indicated at $L_3$ in FIG. 2, will be increased which will result in a reduced hydrostatic head at that control valve 48 and consequently reduce the suction at its corresponding port 54. Conversely, by increasing the size of the flow orifice 120 in one control valve 48 relative to the others the sludge level $L_3$ in its pipe 102 will decrease which will result in an increased hydrostatic head at that control valve 48 and consequently an increase in the suction at its corresponding port 54. It is important to note that the proportion of the total flow through each conduit 42 is not dependent upon the total sludge withdrawal rate through the ports 54 or the total sludge removal rate from the sightwell 46.

It can readily be appreciated that the liquid levels $L_2$ and $L_3$ respectively in the sightwell 46 and the pipes 102 can never exceed the static liquid level $L_1$ in tank 11. When the levels $L_2$ and $L_3$ equal the level $L_1$ the hydrostatic head is counter-balanced and there will be no sludge flow through the sludge removal system 40. This being the case by dimensioning the orifices 120 such that the upper portions thereof extend above the static liquid level $L_1$ they will never be completely submerged. This is important as it prevents the collection of floating or suspended solids which would otherwise have to be periodically removed.

From the foregoing it is apparent that the present invention provides a unique and improved sludge removal system for use in hydrostatic pressure type sludge removal clarifiers. By fabricating the suction arm from self-supporting sludge conduits positioned in a common vertical plane, the present invention eliminates the need of the heretofore required structural arrangements which serve only to increase the torque requirement of the drive assembly and tend to cause rotation of the entire mass of the sludge blanket. Additionally, the unique control valve assembly of the present invention eliminates the build-up of floating or suspended matter on the top surface of the sludge receiving areas above the riser tubes.

Obviously many modifications and variations of the present invention are possible in light of the above teachings. It is, therefore, to be understood that, within the scope of the appended claims, the invention may be practiced otherwise than as specifically described.

What is claimed is:

1. In a circular clarifier tank having an inlet for receipt of liquid influent with entrained solids, an upper overflow outlet for removal of clarified liquid, and a bottom surface on which settled solids deposit; an improved sludge removal assembly comprising:
   a. a suction arm having a plurality of selfsupporting structural sludge conduits of different lengths, extending radially outward from and mounted for rotation about a substantially vertical axis extending through the center of the tank, said sludge conduits being secured to one another in a common horizontal plane above the bottom surface of said tank;
   b. said sludge conduits having inlet suction ports along their bottoms surfaces adjacent the outer ends thereof for receiving sludge from said bottom surface of said tank;
   c. a plurality of substantially vertical riser tubes secured at their lower ends to the inner ends of the corresponding sludge conduits adjacent said vertical axis of said tank;
   d. a sightwell assembly positioned above the upper ends of said riser tubes having a lower portion below the static liquid level in said tank and an upper portion above the static liquid level in said tank; and
   e. flow control valve assembly means associated with the upper ends of each of said riser tubes for controlling the respective flow rates from said riser tubes into said sightwell assembly;
   f. said flow control valve assembly means including adjustable orifice means having a lower portion below the static liquid level in said tank and an upper portion above the static liquid level in said tank.

2. The invention as defined in claim 1 wherein said flow control valve means includes a stationary outer pipe and an inner pipe rotatably mounted within said stationary pipe about a substantially vertical axis, said outer pipe and said inner pipe have vertically extending slots therethrough so as to form said adjustable orifice means.

3. The invention as defined in claim 2 wherein said inner pipe has a control handle associated with an upper portion thereof for selective rotation of said inner pipe.

4. The invention as defined in claim 3 wherein said slots in said outer and inner pipe are of substantially rectangular shape.

5. The invention as defined in claim 1 further including V-shape scraper blade means secured to said bottom surfaces of said sludge conduits for directing sludge into said sludge conduits through said inlet ports.

6. The invention as defined in claim 5 wherein said sludge conduits are of substantially rectangular shape.

7. The invention as defined in claim 6 wherein said sludge conduits are constructed of ¼ inch structural steel tubing.

8. In a circular clarifier having an inlet for receipt of liquid influent with entrained solids, an outlet for removal of clarified liquid, and a bottom surface on which settled solids deposit; an improved sludge removal assembly comprising:
   a. a hollow center column extending upward from a central portion of said bottom surface;
   b. a drive assembly supported immediately above said center column;
   c. a sightwell assembly supported below said drive assembly surrounding said center column for rotation about a substantially vertical axis;
   d. a torque cage secured to said sightwell assembly and extending downward therefrom around said center column for rotation therewith;
   e. a suction arm having a plurality of selfsupporting structural sludge conduits of different lengths, extending radially outward from and mounted for rotation with a lower portion of said torque cage, said sludge conduits being secured to one another in a common horizontal plane above the bottom surface of said tank;
   f. suction ports formed at the bottom surfaces of said sludge conduit adjacent the outer ends thereof for receiving sludge from said bottom surface of said tank;
   g. a plurality of substantially vertical riser tubes secured at their lower ends to the inner ends of the corresponding sludge conduits and at their upper ends to said sightwell assembly for fluid communication therewith; and
   h. flow control valve assembly means positioned within said sightwell assembly and associated with the upper ends of each of said riser tubes for controlling the respective flow rates from said riser tubes into said sightwell assembly;
   i. said flow control valve assembly means including adjustable orifice means having a lower portion below the static liquid level in said tank and an upper portion above the static liquid level in said tank.

* * * * *